United States Patent [19]

Gary

[11] Patent Number: 5,117,689
[45] Date of Patent: Jun. 2, 1992

[54] MICROWAVE TEMPERATURE PROFILER FOR CLEAR AIR TURBULENCE PREDICTION

[75] Inventor: Bruce L. Gary, Temple City, Calif.

[73] Assignee: The United States of America as represented by the Administrator, National Aeronautics and Space Administration, Washington, D.C.

[21] Appl. No.: 618,790

[22] Filed: Nov. 27, 1990

[51] Int. Cl.⁵ .......................................... G01C 21/00
[52] U.S. Cl. .................... 73/178 R; 364/443; 374/112
[58] Field of Search ............. 73/178 R, 178 T, 178 H, 73/170 R; 364/443; 374/112; 244/177

[56] References Cited

U.S. PATENT DOCUMENTS

| | | | |
|---|---|---|---|
| 3,359,557 | 12/1967 | Fow et al. | 343/100 |
| 3,380,055 | 4/1968 | Fow et al. | 343/100 |
| 3,427,581 | 2/1969 | Hartman | 340/25 |
| 3,465,339 | 9/1969 | Marner | 343/100 |
| 3,498,132 | 3/1970 | Smith et al. | 73/355 |
| 3,696,670 | 10/1972 | Collis | 73/170 R |
| 3,722,272 | 3/1973 | McPherson | 73/178 R |
| 3,935,460 | 1/1976 | Flint | 250/349 |
| 4,043,194 | 8/1977 | Tanner | 73/178 T |
| 4,222,265 | 9/1980 | Ravussin | 73/170 R |
| 4,346,595 | 8/1982 | Gary | 73/178 R |
| 4,427,306 | 1/1984 | Adamson | 73/170 R |
| 4,474,062 | 10/1984 | Gary | 73/178 R |
| 4,589,070 | 5/1986 | Kyrazis | 364/464 |
| 4,593,285 | 6/1986 | Miller et al. | 340/968 |
| 4,761,650 | 8/1988 | Masuda et al. | 342/26 |
| 4,855,738 | 8/1989 | Greene | 340/968 |
| 4,905,000 | 2/1990 | Bateman | 340/968 |

OTHER PUBLICATIONS

Bruce L. Gary, "An Airborne Sensor For The Avoidance Of Clear Air Turbulence", AIAA 19th Aerospace Sciences Meeting, pp. 1-6, Jan. 12-15, 1981 St, Louis, Mo.
Bruce L. Gary, "Clear Air Turbulence Avoidance Using An Airborne Microwave Radiometer", AIAA 22nd Aerospace Sciences Meeting, Jan. 12-14, 1984 Reno, Nev., pp. 1-4.
Bruce L. Gary, "Observational Results Using the Microwave Temperature Profiler During the Airborne Antarctic Ozone Experiment", Journal of Geophysical Research, vol. 94, No. D9, pp. 11,223-11,231, Aug. 30, 1989.
Richard F. Denning, et al., "Instrument Description of the Airborne Microwave Temperature Profiler," Jrnl. Geophys. Research, vol. 94, No. D14 pp. 16,757-16,765, Nov. 30, 1989.

*Primary Examiner*—Donald O. Woodiel
*Attorney, Agent, or Firm*—Thomas H. Jones; John R. Manning; Guy M. Miller

[57] ABSTRACT

A method for determining Richardson Number, Ri, or its reciprocal, RRi, for clear air turbulence prediction using measured potential temperature profiles and determining the vertical gradient of potential temperature, $d\theta/dz$. Wind vector from the aircraft's instrumentation versus potential temperature $dw/d\theta$ is determined and multiplied by $d\theta/dz$ to obtain $dW/dz$. Richardson Number or its reciprocal is then determined from the relationship $$R_i = k \left[ \frac{d\theta}{dz} \div \left( \frac{dW}{dz} \right)^2 \right]$$

for use in detecting a trend toward a threshold value for the prupose of predicing clear air turbulence. Other equations for this basic relationship are disclosed together with the description of a method for combining of other atmospheric observables using multiple regression techniques to produce improved warnings of clear air turbulence.

7 Claims, 8 Drawing Sheets

MICROWAVE TEMPERATURE PROFILER FOR CLEAR AIR TURBULENCE PREDICTION

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to a method employed aboard an aircraft for predicting clear air turbulence (CAT) from remote sensor measurements of air temperature vertical gradient and in situ measurements of horizontal wind vector from an inertial navigation system (INS) for inferring vertical wind shear, and more particularly to determining from these measurements atmospheric dynamic stability (Richardson Number), which is generally recognized as having CAT encounter predictive capability.

BACKGROUND ART

CAT continues to plague commercial and military aircraft. CAT represents more than just an annoyance to passengers; it is a distraction to the flight crew, it consumes extra fuel (by reducing fuel efficiency and by requiring horizontal diversions around regions of suspected CAT), and it contributes to airframe metal fatigue leading to structural failure during flight and landings.

A new type of unmanned vehicle is being designed for military reconnaissance. Some of these vehicles have large wingspans, fly slowly, and cannot tolerate moderate turbulence because of their vulnerability to unrecoverable aerodynamic upset. These reconnaissance aircraft also need a CAT prediction capability in order to avoid such turbulence.

In the field of CAT prediction, key factors that determine Richardson Number (Ri) are vertical air temperature gradient and vertical wind shear. Since low values of the Richardson Number are known to be necessary for production of CAT, it is important to have on board an aircraft the facilities for monitoring Ri, or its reciprocal RRi, for predicting in real time when and where CAT will occur and how severe it will be.

STATEMENT OF THE INVENTION

In accordance with the present invention, Richardson Number (Ri) is determined for CAT predictions.

There are four steps to providing the information needed for determining Ri. The first step is to determine the vertical gradient of potential temperature, $d\theta/dz$. This may be done by measuring brightness temperature with a passive microwave radiometer operating at frequencies near 58 GHz, where oxygen molecules emit thermal radiation. The viewing direction of the radiometer is scanned through a selection of elevation angles. Measured brightness temperature versus elevation angle is converted to air temperature T versus altitude, z. Potential temperature $\theta$ is then derived from air temperature and pressure at the aircraft's altitude. These are then converted to profiles of potential temperature, $\theta$, from which it is possible to derive the vertical gradient of potential temperature, $d\theta/dz$.

The second step is to determine the correlation of wind vector (from the aircraft's INS) versus potential temperature $\theta$, and more specifically by determining the slope of both the EW and NS wind components, U and V, versus potential temperature, i.e., $dU/d\theta$ and $dV/d\theta$. The orthogonal sum of these is the "gradient of wind vector with potential temperature," $dW/d\theta$.

The third step is to multiply $dW/d\theta$ by the "gradient of potential temperature with altitude" to obtain "vertical wind shear,"

$$VWS = \left(\frac{dW}{d\theta}\right)\left(\frac{d\theta}{dz}\right) = \frac{dW}{dz}.$$

The fourth step is to calculate Richardson Number, Ri, which is the ratio of stabilizing forces to overturning forces derived from the above-mentioned vertical gradients:

$$Ri = k\left[\frac{d\theta}{dz} \div \left(\frac{dW}{dz}\right)^2\right]$$

It is more convenient to use the reciprocal RRi = 1/Ri as the parameter for CAT prediction. When RRi < 1 for an atmospheric layer, it is stable and the growth of small vertical perturbations is suppressed. When RRi > 4 for an atmospheric layer, small perturbations grow until wave breakdown. Typically RRi is $10^{-1}$ to $10^{-3}$, and only rarely is as large as 1. The trend of RRi along a flight path allows for extrapolation, and when the extrapolated RRi trend extends toward the critical region of 1 to 4, a CAT warning is indicated.

The severity of the turbulence can be determined by the magnitude of overturning energy per unit altitude increment, which is simply an evaluation of $(dW/dz)^2$ calculated for the extrapolated situation of RRi = 4, which can be calculated from $d\theta/dz$ and $dW/dz$. CAT avoidance in response to a warning calls for an evasive maneuver based on the premise that most CAT is produced by Kelvin-Helmholtz wave growth within inversion layers. Therefore, the most severe CAT is to be avoided by making the quickest flight level change leading to escape from the inversion layer. The temperature profile can be used to locate the altitude boundaries of the inversion layer.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
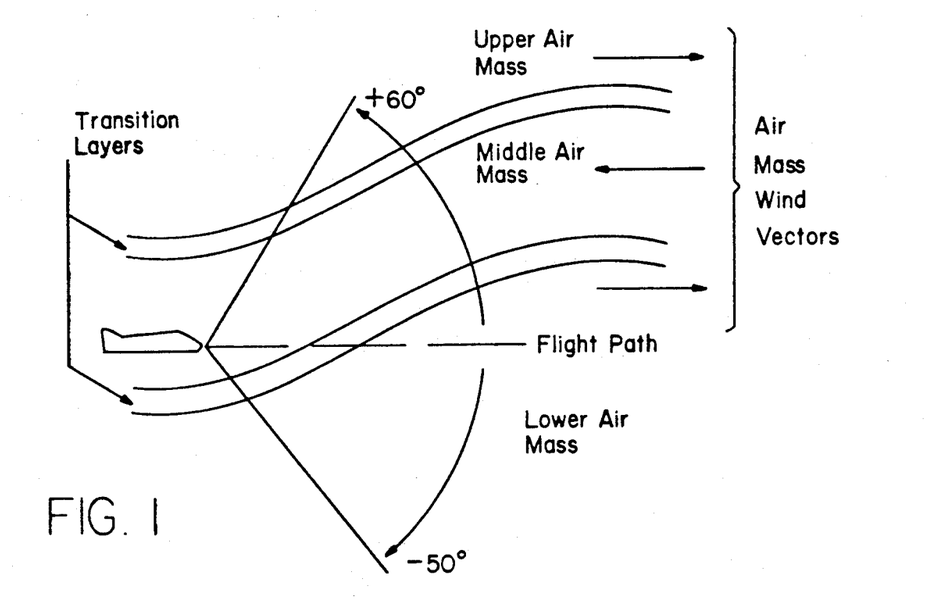
FIG. 1 illustrates a stack of air masses in the stratosphere overlying each other with shallow transition layers between them.

The stratosphere consists of a stack of air masses overlying each other, with shallow transition layers between them, as shown in FIG. 1. Each air mass moves in a distinct horizontal direction governed by its history. Consequently, vertical wind shear is concentrated in the transition layers. Temperature contrasts are also concentrated in the transition layers which are often "inversion layers." The most common generator of CAT is the transition layer separating the troposphere from the stratosphere, called the tropopause. A tropopause containing an inversion layer temperature feature is an especially CAT prone transition layer.

The presence of the transition layers can be inferred from vertical profiles of Richardson Number, or preferably the reciprocal of Richardson Number, RRi, i.e., the ratio between overturning forces to stabilizing forces. The transitions are marked by enhanced values of RRi. Since air masses can have a component of vertical motion, the interfaces are not always horizontal. Flight at a constant altitude may sometimes intersect the transitions layers, as shown in FIG. 1.

CAT is generated when $Ri < \frac{1}{4}$, i.e., when RRi exceeds 4, and it persists until RRi becomes less than 1. It is still open for speculation how far RRi will be driven below 1 by the homogenizing action of CAT. In non-CAT regions, RRi typically has values of about 0.1 or less. Since air for which RRi>4 will produce CAT throughout neighboring regions meeting the criterion of RRi>1, there is always the possibility of CAT when RRi>1. Further, since CAT is felt at layers that border the altitude regime where it is generated (albeit at a lower severity level, it is important to keep in mind that CAT can even be encountered when RRi<1. If RRi varies gradually with altitude, then larger RRi values can be expected to be associated with greater probabilities of CAT, even when RRi<1. Thus, the probability of CAT at given intensity levels can be expected to increase in going from "typical" RRi to "borderline" RRi, where typical $\approx 0.1$ and borderline $\approx 1$.

It is also important to keep in mind that CAT reduces RRi, bringing it closer to "typical" values, with a time-scale that may be short compared to the life of the CAT. In other words, CAT may quickly "wash out" the high RRi values that generated it, then linger at ever-decreasing severity, during which the energy in the vortices cascade to smaller and smaller scales (eventually becoming "thermalized"). Hence, if CAT produces RRi values that are <1, yet are still >0.1 (the normal background level), these regions should have a finite probability of being turbulent due to the difference in timescales for RRi destruction and CAT dissipation. A conclusion from these several arguments is that RRi values below 1 may not be as "innocent" as would be suggested by first-order Kelvin-Helmholtz wave theory and Richardson Number stability theory.

Figure 2A:
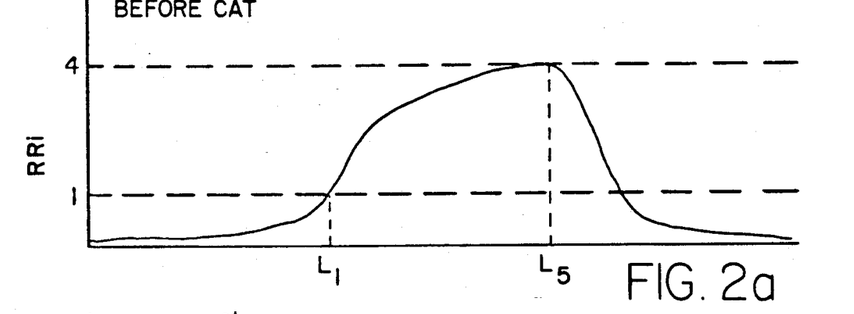
FIGS. 2a through 2d depict time traces of an imaginary flight through a transition region that has high RRi values during the middle portion of the flight.

FIGS. 2a through 2d depict time traces of an imaginary flight through a transition region that has high RRi values during the middle portion of the flight. In FIG. 2a, it can be imagined to be a horizontal transition layer that is close to instability for only the middle portion, or it can be imagined to be produced by flight through a transition layer that is slightly inclined to the horizontal and which is close to the threshold for becoming unstable throughout a much larger horizontal extent than is shown. The following arguments will be valid for either imagined geometry.

FIG. 2a shows RRi versus time, and the central part of this plot exhibits RRi above normal and slightly exceeding RRi=4 at the center. In the early part of the flight, CAT has not yet been generated because the instability criterion RRi>4 has only been reached at location $L_5$.

Figure 2B:
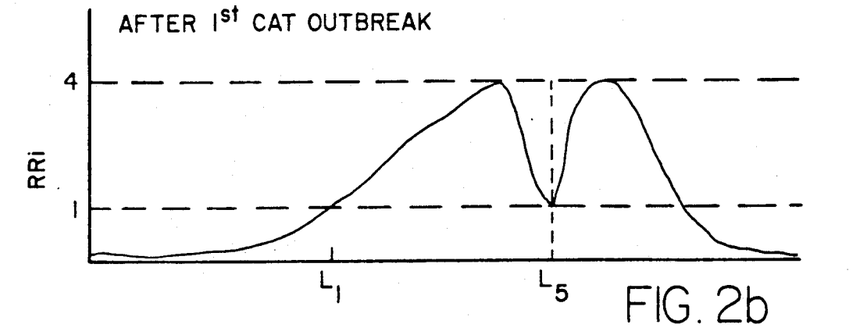
Figure 2C:
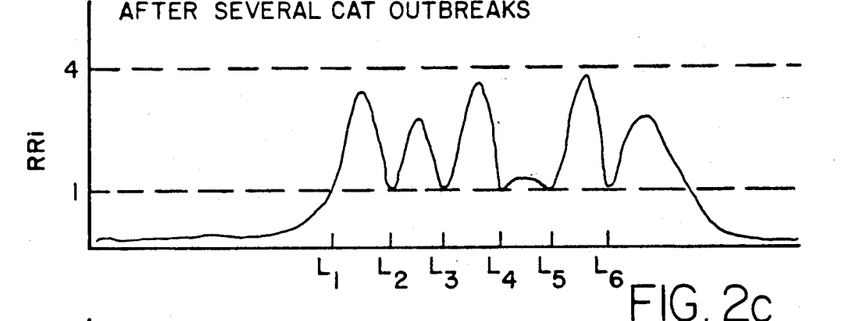

FIG. 2b shows what might be observed on a later flight through the same region, after an outbreak of CAT has occurred at location $L_5$ where RRi had exceeded 4 for a sufficient time. FIG. 2c shows conditions during an even later flight pass, after several patches of CAT have occurred at locations $L_2$-$L_6$. At this time, the CAT from these outbreaks is still dissipating, which takes longer than the initial homogenizing of the transition layer (and reduction of RRi). Thus, CAT may still be encountered where RRi has been reduced, but it is not encountered where RRi is still high (as well as where RRi has never been high).

Figure 2D:
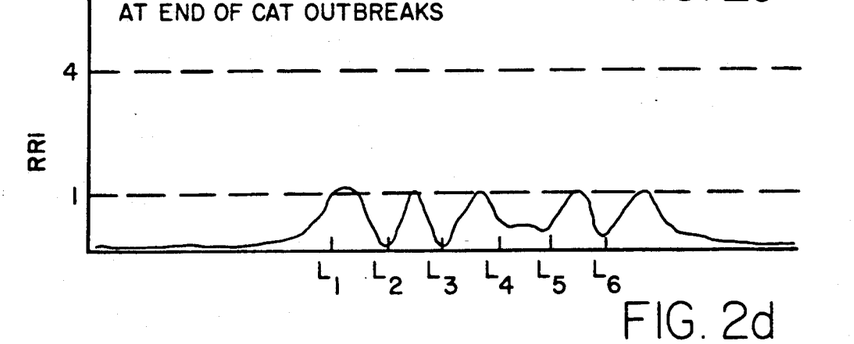

In FIG. 2d, all the high RRi regions centered on locations $L_2$-$L_6$ have produced CAT, and the transition layer has "exhausted itself" of CAT-producing vertical wind shear. All RRi values are <1, and perhaps they are much less than 1. However, residual CAT (at some intensity level) may still exist throughout the middle region of FIG. 2d. If the remnant RRi values distinguish themselves from the normal background levels, then the "intermediate" values for RRi might be associated with light CAT.

Note that there is a negative correlation of CAT with RRi within the region of initially high RRi. The distance scale of the initially high RRi (the field of CAT patches) is typically 500 to 1000 km, whereas the distance scale for the individual CAT patches is 20 to 50 km. Therefore, with this model, the method of the present invention predicts a negative correlation of CAT with RRi for distance scales of less than 100 km, and positive correlations for distance scales exceeding 100 500 km.

Kelvin-Helmholtz (KH) wave amplitude is theorized to grow unchecked and trigger CAT, provided RRi>4 for a sufficient length of time. CAT sustains itself (i.e., continues to extract energy from the horizontal wind field and thermalize that energy) until RRi$\leq$1. When KH waves overturn, they homogenize the CAT layer by stochastically exchanging air parcels. This process leads to a reduction of the vertical wind shear to very low values and also produces a fairly uniform potential temperature field (thereby completely destroying any pre-existing inversion layer). Thus, the method of the present invention will allow for the possibility that CAT converts air from RRi$\geq$4 to RRi<1. Perhaps RRi is reduced to values much lower than 1, such as 0.1.

It should be kept in mind that RRi and CAT have 3-D distributions, and not 2-D as suggested by FIGS. 2a-2d for simplicity of illustration. The sequence of CAT formation and spreading can be expected to have distinct patterns in the vertical dimension. For example, CAT may start at a middle altitude (where RRi is presumably a maximum) and spread vertically toward both the upper and lower edges of the transition layer. Another complication to keep in mind is that in the real world flight paths can course through these distributions at odd angles and in other than straight and level flight. This complication will have to be dealt with in further refinements of CAT warning algorithms for ascents and descents.

Vertical Wind Shear (VWS) Algorithm

Figure 8:
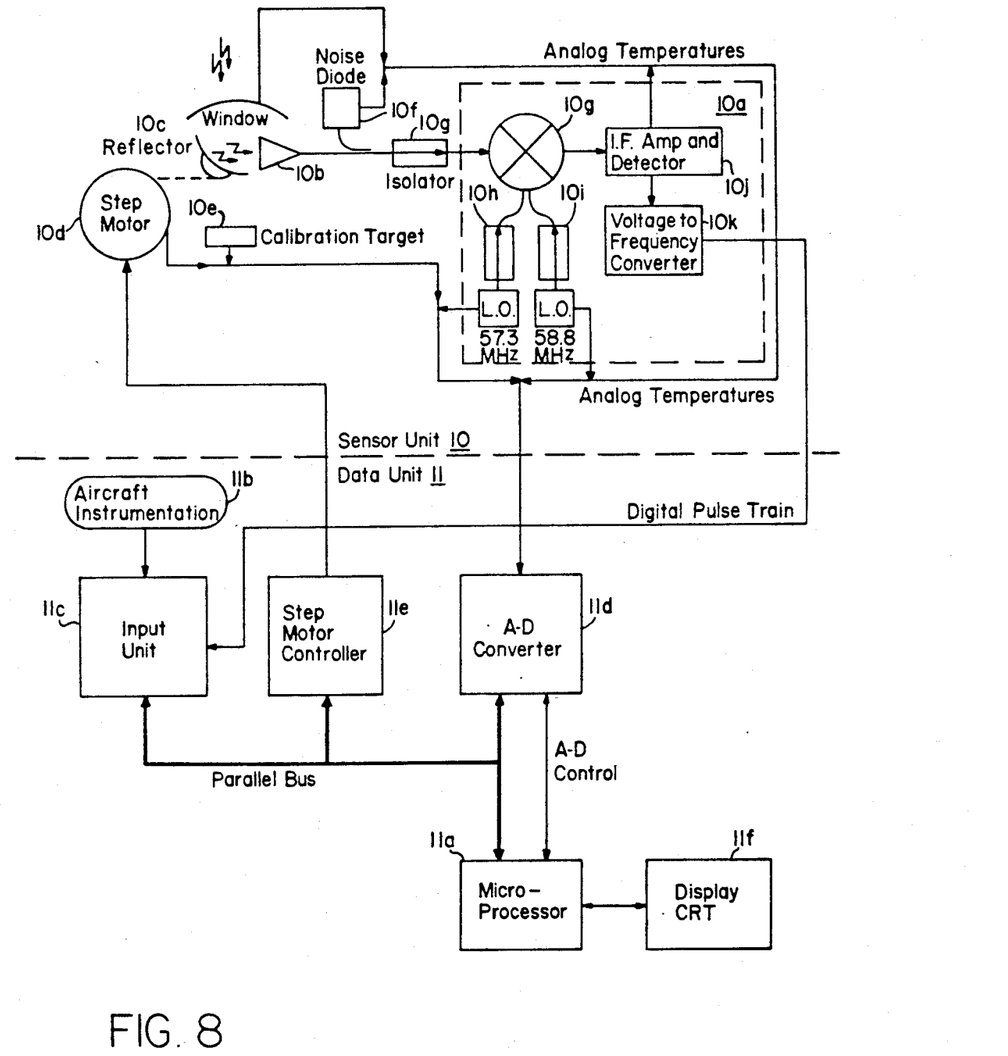
FIG. 8 is a functional block diagram of an airborne microwave temperature profiler (MTP) for a CAT warning system.

In the method of the present invention, determining VWS requires measurements of (1) the U and V wind vector components by an inertial navigation system (INS), where U and V are the EW and NS components of the horizontal wind vector, (2) air temperature and aircraft pressure altitude, and (3) air temperature lapse rate, defined to be dT/dz, derived by a microwave temperature profiler (MTP) shown In FIG. 8. Air "brightness temperature" versus elevation angle is measured by a vertically scanning radiometer and converted to air temperature T versus altitude z. Potential temperature $\theta$ is then derived from air temperature T(z) and pressure altitude P(z) using the conventional definition:

$$\theta = T[K](1000/P[mb])^{0.286}.$$

Surfaces of equal $\theta$ are called "isentropes" and since $\theta$ is a property of the air that does not change with an air parcel's adiabatic altitude excursions, isentropes can usually be thought of as streamlines of air movement.

The crucial insights leading to the realization that VWS can be derived with existing INS sensors, and which is used in the present invention, is summarized by the following two facts:

(1) $dU/d\theta$ and $dV/d\theta$ can be derived using in situ measurements of U and V while $\theta$ is also derived; this is done by creating scatter plots of U and V versus $\theta$ during altitude excursions of either the aircraft or isentrope surfaces, i.e., by real-time correlations of wind vector components U and V with potential temperature $\theta$ for specified intervals, such as 30-seconds. The 30-second data for the U and V wind vector components are regressed against $\theta$ and time simultaneously as independent variables to minimize the confounding influence of horizontal wind gradients on the solution for the vertical gradient.

(2) These $\theta$-derivatives can be converted to altitude derivatives by simply multiplying by $d\theta/dz$, which can be calculated from knowledge of air pressure and air temperature lapse rate dT/dz (measured by the MTP instrument).

These two steps allow calculation of dU/dz and dV/dz, which can be orthogonally added to produce the vector value of vertical wind shear, VWS, which is the crucial parameter needed for calculating Richardson Number. A more compact equation for Richardson Number (and its reciprocal) is derived in the following section appendix, and it is this equation which is used in the analysis of the present invention.

It will be instructive to follow derivations of more familiar atmospheric properties. The next several paragraphs are presented with this purpose in mind.

For various reasons there may be an optimum duration for the time chunks of data used in performing least squares regression analyses in which the U and V wind components are chosen, in turn, to be the dependent variable, and time and $\theta$ are used simultaneously as independent variables. The proposed regression analysis produces solutions for the horizontal gradient of the wind components, dU/dt and dV/dt, the gradients of the wind components with $\theta$, $dU/d\theta$ and $dV/d\theta$, and the RMS fit before and after the fitting analysis, $RMS_o$ and $RMS_f$.

Three-point weighted averages of the partial derivatives of U and V with $\theta$ are less affected by horizontal wind gradients, provided a proper weighting equation is used. The weighting can be performed on the U and V gradients separately using the following equation:

$$Weight = 1/\{(1+(HG/5.6)^2+(RMS_f/35)^2\}$$

where HG=dU/dt or dV/dt, and has dimensions [m/s per second]. The weighted-average $dU/d\theta$ and $dV/d\theta$ can be converted directly to dU/dz and dV/dz by multiplying by $d\theta/dz$. When this is done, the orthogonal sum of the resultant derivatives of U and V with z corresponds to the desired VWS.

Another equivalent algorithm is also possible, which preserves like-observables for as long as possible in the derivation (and corresponds with the derivation in the section above). The orthogonal sum of the two $\theta$-derivatives of U and V can be formed, called "VWS$\theta$"[m/s per $\theta$K]:

$$VWS\theta = \{(dU/d\theta)^2+(dV/d\theta)^2\}^{\frac{1}{2}} \quad (1)$$

By multiplying "VWS$\theta$" by "$d\theta/dz$," the value VWS [m/s per km] for the vertical gradient of horizontal wind in terms of altitude z (instead of $\theta$) is obtained. $d\theta/dz$ [$\theta$K/km] is calculated from MTP-derived lapse rate dT/dz [K/km], and in situ (INS) measurements of air pressure, P [mb], according to the relation:

$$d\theta/dz = (dT/dz+10)*(1000/P)^{0.286} \quad (2)$$

By combining these equations, we obtain a relation for VWS [m/s per km]:

$$VWS = VWS\theta \, (d\theta/dz) \quad (3)$$

Ri is normally stated in terms of the parameters just described, namely:

$$Ri = (g/\theta) \, [(d\theta/dz)/VWS^2] \quad (4)$$

where g=9.8 [m/s$^2$], the force of gravity. However, a simple rearrangement of terms allows an alternative expression to be derived for Reciprocal Richardson Number, RRi. That expression may be regarded as better because it contains quantities that are "closer" to the observed quantities. The expression is:

$$RRi = (\theta/9800) \, (dT/dz+10) \, (1000/P)^{0.286}$$
$$\{(dU/d\theta)^2+(dV/d\theta)^2\}$$

where $\theta$ has units [K], dT/dz has units [K/km], and $dU/d\theta$ and $dV/d\theta$ have units [m/s per $\theta$K]. The reciprocal Richardson Number ($\equiv 1/Ri$) is better "behaved" than Ri when temporal averaging is performed. Consequently, RRi is preferable to use for the derivation of CAT warnings.

Figure 3A:
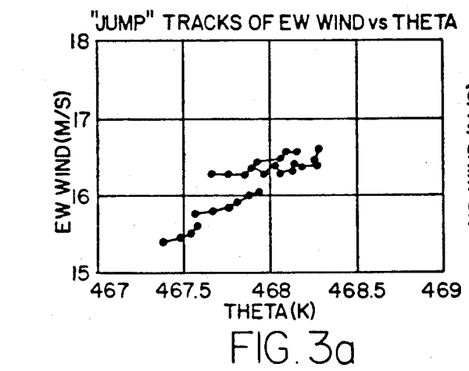
FIGS. 3a through 3f show three 20-second sets of wind tracks for both EW and NS horizontal components, U and V, as a function of potential temperature $\theta$.
Figure 3B:
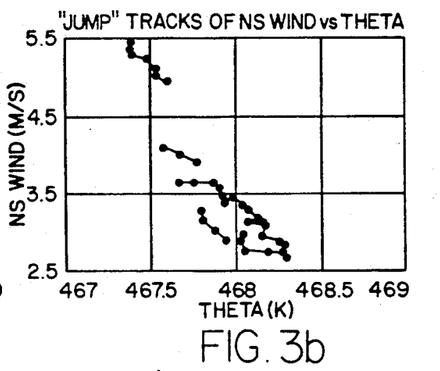

FIGS. 3a to 3f illustrate three 20-second sets of wind versus potential temperature tracks that "jump" indicating a vertical wind shear, VWS. FIGS. 3a, c and e are for EW-component (U) data and FIGS. 3b, d and f are for NS-component (V) data. Note the pattern of lower-left to upper-right for the left column plots and the upper-left to lower-right slope for the right column plots. The EW-component U of VWS is positive, while the NS-component V of VWS is negative. The total VWS, being the orthogonal sum of U and V components, is approximately 30[m/s per km] during this period.

Figure 3C:
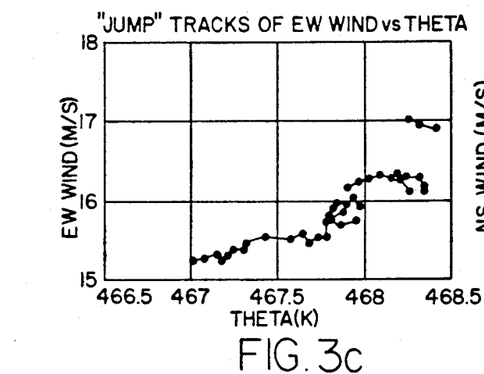
Figure 3D:
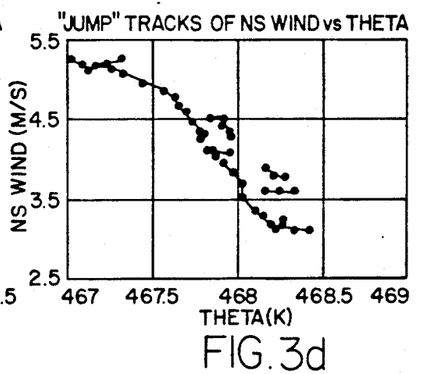
Figure 3E:
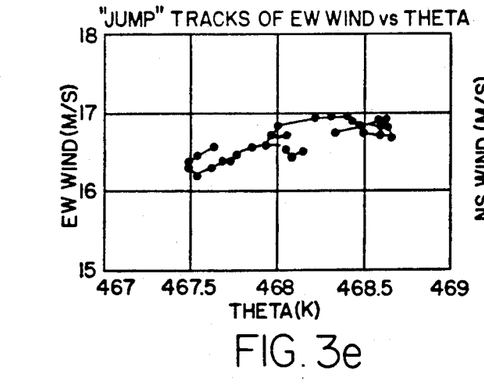
Figure 3F:
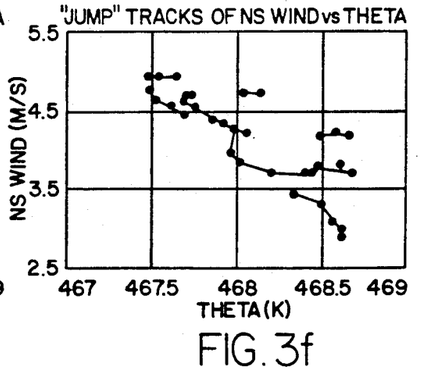

The left column of FIGS. 3a, c and e shows that for three successive 20-second intervals the U component increases with $\theta$, with a slope of about $+1.0$ [m/s per $\theta$K], and the V component decreases with $\theta$ with a slope of $-2.0$ [m/s per $\theta$K]. For this case, the gradient of the wind vector shears at the rate of $$VWS\theta = (1.0^2 + 2.0^2) = 2.2 \ [m/s \ per \ \theta K].$$

Figure 4:
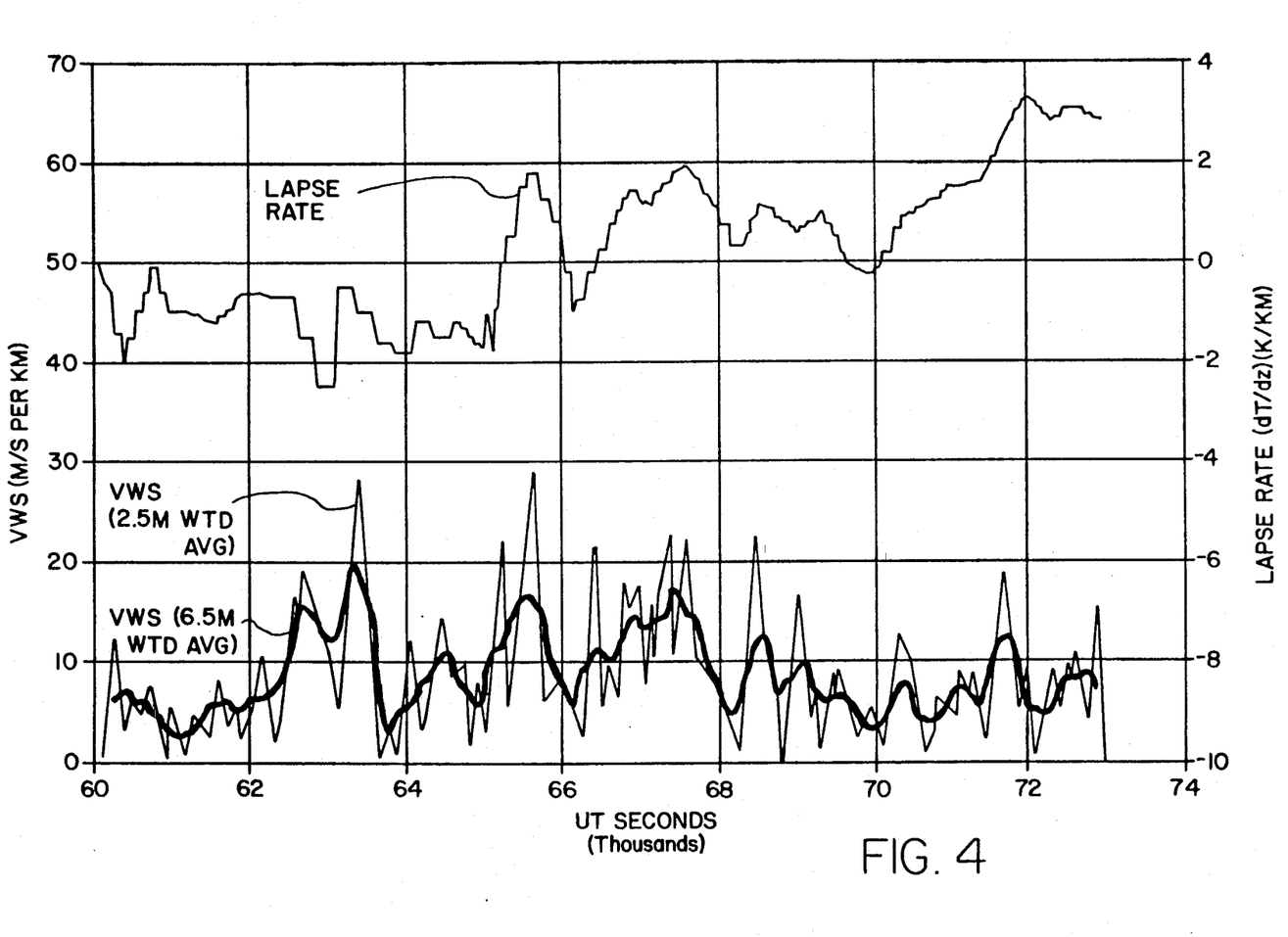
FIG. 4 is a plot of VWS and lapse rate (dT/dz versus time).

FIG. 4 shows dT/dz averaging $-1.5$ [K/km] at a time corresponding to the data of FIG. 3 (time equals 63,500 seconds). Adopting $\theta = 468$ K and P 56 [mb], RRi is calculated $$RRi = 0.93 \ \{(dU/d\theta)^2 + (dV/d\theta)^2\}$$

where the $\theta$ wind gradient is in units [m/s per $\theta$K]. For a VWS$\theta$ gradient of 2.2 [m/s per $\theta$K], calculated above, it is calculated that RRi=2.0, or Ri=$\frac{1}{2}$, which is close to the critical threshold for Kelvin-Helmholtz instability considering that RRi typically has values <0.1 (i.e., Ri is typically >10).

Example Illustration of RRi and CAT

Figure 5:
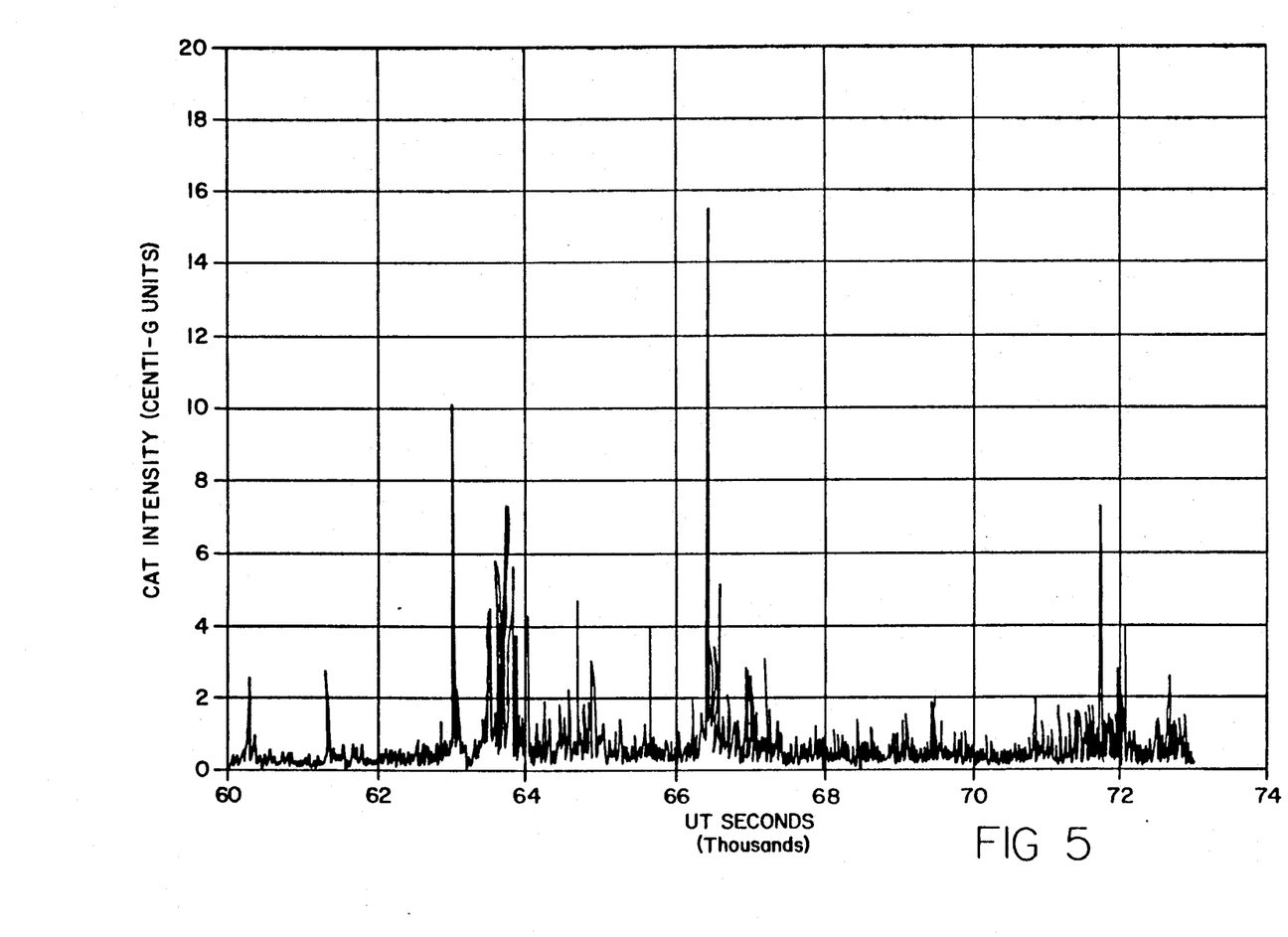
FIG. 5 is a plot of CAT intensity versus time during a flight segment.

FIG. 5 portrays CAT intensity versus time during the same flight path depicted in FIG. 4 in which horizontal flight path position is given in terms of time, or "UT seconds" with respect to an arbitrary reference time.

Figure 6:
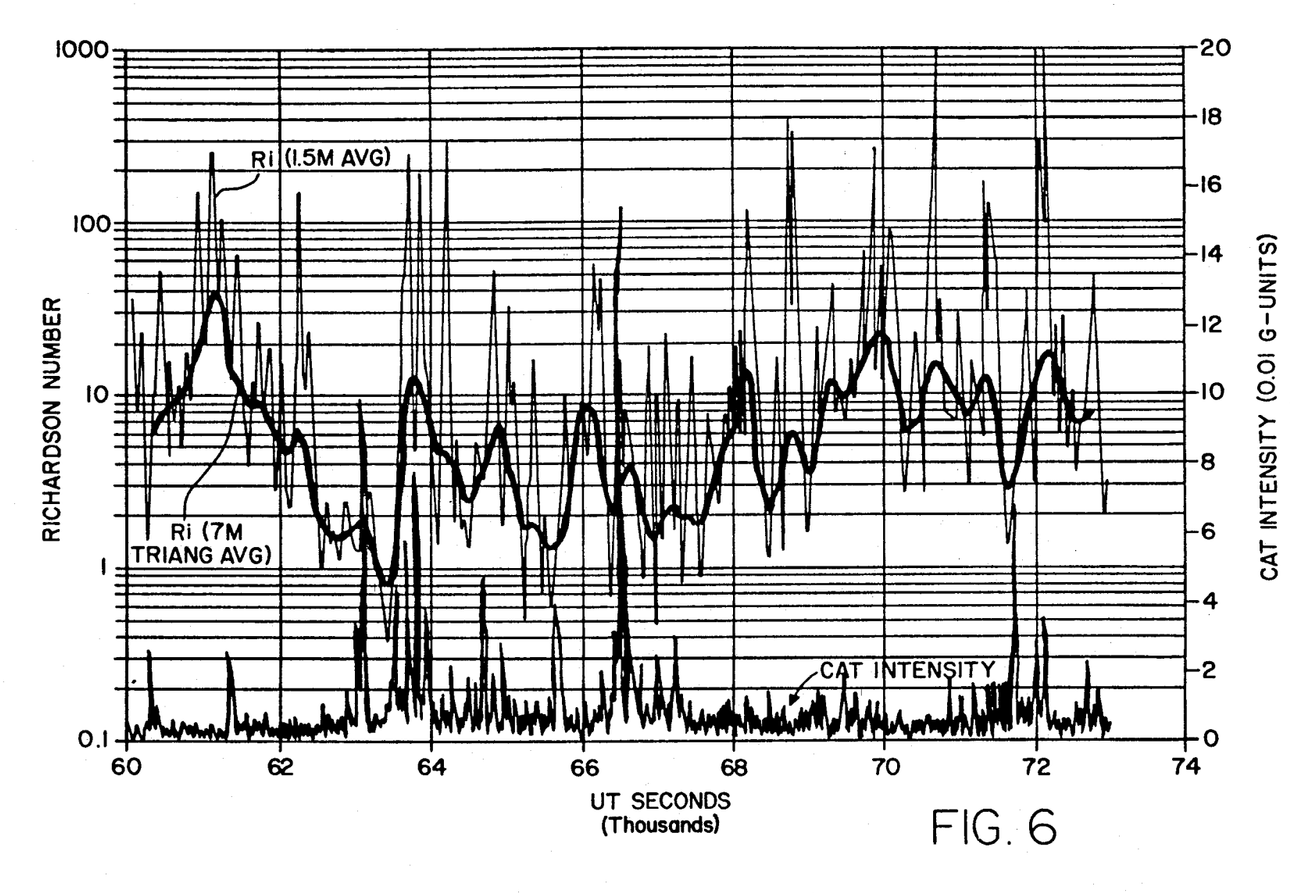
FIG. 6 is a plot showing Richardson Number, Ri, and CAT intensity during the flight segment of FIG. 5.

FIG. 4 plots lapse rate dT/dz and VWS versus time FIG. 6 is a plot showing Richardson Number. Ri dips below 2 for the first time at 62.5 ksec (62,500 sec past the reference time) and 8 minutes later, at 63.0 ksec, light CAT is encountered. There is a pattern of low Ri from 62.5 to 69.0 ksec, where Ri is generally <5. Outside this region Ri is typically $\simeq 10$. The solid line trace for Ri is actually the reciprocal of running averages of RRi, which accounts for the trace tending to follow the lower region of Ri excursions plotted in dotted lines instead of the upper region. CAT intensity is plotted using the scale on the right.

Figure 7:
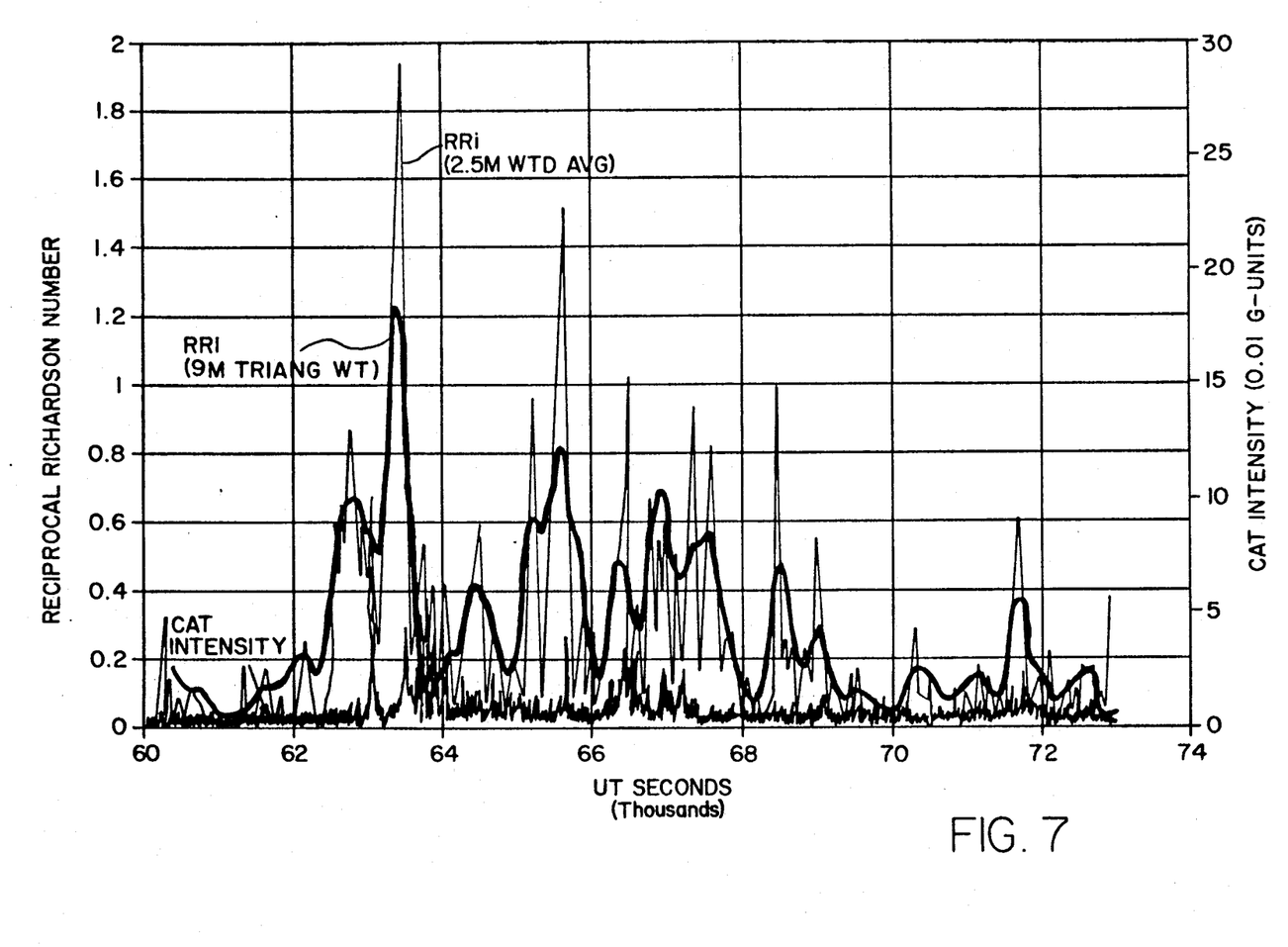
FIG. 7 is a plot of the reciprocal of Richardson Number, RRi, and CAT intensity versus time for the same flight segment of FIGS. 5 and 6.

Note that in the plot of FIG. 6, there is a correlation between CAT spikes and Richardson Number approaching and dropping below 1. This is made much clearer by plotting the reciprocal of Richardson Number, RRi, in FIG. 7. The reason for the better behavior of RRi is related to the different way fluctuations in the values of numerators and divisors affect their ratio. It is always better for a parameter to be defined with the most fluctuating part as the numerator. VWS exhibits greater percentage fluctuations in the real atmosphere than d$\theta$/dz, and it appears squared in the Ri equation. Since Ri has VWS in the denominator, it is preferable to plot its reciprocal, RRi, for display and use it in predicting CAT.

The 2.5 minute averaged RRi trace reaches a maximum of 1.9 at 63.4 ksec. The unaveraged data shows a maximum of 2.2 at this time, consistent with the data of FIG. 3, which was for this time. Immediately after the peak in RRi, one of the main CAT events begins. There is a negative correlation of CAT with RRi within the early part of the "CAT containing region." CAT patches extend from 63.0 to 67.0 ksec (referring to FIG. 5). The pattern of high RRi extends from 62.5 to 69.0 ksec, a slightly larger region.

It is possible to imagine that before the outbreak of CAT patches, the RRi trace rose from 0.1 to values >1 and perhaps as high as 4 throughout the "CAT containing region." As each CAT patch occurred, it quickly reduced RRi to low values and was left surrounded (horizontally) by high RRi regions. The edges of the high RRi region are assumed to be the last to generate CAT; i.e., that CAT patches occur first near the center of the high RRi region and then randomly occur at locations that move toward the outer edge of the high RRi region. At some stage in this process, there may exist an outer ring of high RRi, inside of which RRi is low but turbulent (with decaying CAT). This assumption would provide an ideal geometry for predicting CAT encounters.

The RRi criterion for distinguishing between CAT patch association and no association seems to be 0.2 (i.e., Ri=5). Within the "CAT containing region," which is defined as including the "ring" regions (i.e., from 62.5 to 67.6 ksec), RRi exceeds the proposed RRi criterion 85% of the time. Outside the "CAT containing region" RRi exceeds the RRi criterion only 16% of the time.

Measuring "vertical wind shear" in this manner and thereby inferring Ri or RRi, has not been previously known or suggested by others. It is a new tool that should, on theoretical grounds, have relevance to CAT prediction. There may be errors in estimating VWS, leading to VWS underestimates or possibly overestimates. It is nearly impossible to verify that the VWS values are correct, short of flying at least two aircraft in formation, one slightly above the other.

If the RRi inferred from the measured VWS continues to correlate with CAT experiences, the question of whether the new VWS measurements are accurate becomes moot for the user interested in predicting and avoiding CAT. The motto "If it works, use it!" would then apply.

Multiple Regression Combination of Observables

Prediction of CAT likelihood should make use of more observables than just Ri or the reciprocal RRi and the trend thereof. From the model depicted in FIGS. 2a-2d, which is supported by the data of FIG. 7, the correlation of CAT with RRi can be complicated. However, "multiple regression" analysis techniques can cope with this situation provided an archive of real measurements of observables and CAT intensity is available for analysis.

An archive of observed parameter values, such as RRi or d$\theta$/dz, in conjunction with subsequently-measured near-future CAT intensity, can always be analyzed using multiple regression analysis techniques to yield a set of linear multiplying "retrieval coefficients" which enable the conversion of any single set of parameter values to a near-future (predicted) CAT intensity. Past CAT itself can be considered an "observable" in this context. The trend of past CAT is another observable. The fluctuation level of air temperature in the recent past and the trend of this parameter are other "observables." There are a potential 20 or so airborne measurable properties that merit consideration for this analysis. Clearly, some of these are more relevant than others, and the multiple regression analysis will assign larger coefficients to these observables compared with the others.

Ri or the reciprocal RRi and the trend thereof, are extremely likely to be one of the most important, most highly correlated observables for near-future CAT prediction. Until now it has not been possible to measure Ri or the reciprocal RRi. Analyses without Ri or the reciprocal RRi show useful correlations with near-future CAT, and these other observables therefor contain information which should not be ignored in making CAT predictions. It is therefore very desirable that a multiple regression scheme be used to make use of all observables that can be measured besides Ri or its reciprocal. Thus, the previous argument for how Ri or the reciprocal RRi can be used is meant only to illustrate the rationale for the concept that Ri or the reciprocal RRi have predictive value in forecasting CAT. Therefore, Ri or RRi should be included in an observed data base of atmospheric conditions on which a "multiple regression" analysis technique is used to formulate forecasts of CAT.

Implementation of Measurements

A passive microwave radiometer is used to measure brightness temperature while scanning the radiometer through selected elevation angles, such as within the range $-50°$ to $+60°$. Measured brightness temperature at the selected elevation angles is converted to air temperature T as a function of altitude, z. This air temperature data is then converted to profiles of potential temperature $\theta$ versus altitude. The slope of $\theta(z)$, defined as $d\theta/dz$, is one of the required parameters needed in deriving Ri or RRi. An airborne microwave temperature profiler (MTP) adaptable to a CAT warning system is shown in FIG. 8 and is described in U.S. Pat. No. 4,346,595 and in a paper by Richard F. Denning, Steven L. Guidero, Gary S. Parks and Bruce L. Gary, "Instrument Description of the Airborne Microwave Temperature Profiler," J. Geophys. Res., 94, D14, 16,757-16,765, Nov. 30, 1989. By reference to this paper, the instrument description contained therein is hereby made a part hereof.

The MTP is comprised of two major assemblies, a sensor unit 10 and a data unit 11, shown in FIG. 8. A superheterodyne radiometer 10a is a major component of the sensor unit which is installed in an aircraft and used to measure profiles of air temperature versus altitude. It operates at frequencies near 58 GHz where oxygen molecules emit thermal radiation. Brightness temperature is measured at a selection of ten viewing elevation angles every 14 seconds in order to provide observed real-time quantities that contain information about the temperature of the air along the viewing direction, which is normally selected to be in a vertical plane in the direction of flight path but may also be in a vertical plane to one side. The observed quantities are converted to air temperature versus altitude z by the data unit 11 using pressure altitude of the aircraft as the origin or reference for converting viewing elevation angles to altitude.

The altitude coverage by the ten viewing elevation angles from $-50°$ to $+60°$ is from about 2 km below to 3 km above the aircraft altitude for flight altitudes of 60,000 feet or 18.3 km, which were typical for the previous usage of this particular MTP instrument. By changing observing frequency slightly, the same 5 km region (from $-2$ to $+3$ km) can be sampled at lower altitudes. An MTP that observes at many frequencies in the 55 to 64 GHz region is able to provide 5 km altitude coverage for all cruise flight altitudes.

Air temperature estimates are made for altitudes within this 5 km altitude range. Temperature profiles are obtained for small increments along the flight path, typically every 2 km for jet aircraft.. A super heterodyne radiometer 10a in the sensor unit is equipped with a horn antenna 10b and a reflector assembly 10c which may be adjusted in position by a stepper motor 10d to enable the reception pattern of the horn antenna to be viewing directions within the range $-50°$ to $+60°$.

The superheterodyne radiometer 10a is conventional. It employs a single mixer and two local oscillators (LO), one operating at 57.3 GHz and the other at 58.8 GHz, which correspond to a wavelength of about 6 mm. Four or more LO units can be incorporated to allow for operation at more altitudes. A microprocessor 11a in the data unit turns on one local oscillator at a time enabling the measurement of atmospheric brightness temperature at many frequencies for each viewing direction.

The power entering the horn 10b is linearly proportional to the "brightness temperature" in the viewing direction. The conversion of radio frequency power level to brightness temperature is achieved using a microprocessor 11a in the data unit 11, which applies the calibration offset of a target 10e to calibrate the output level of the radiometer for a known brightness temperature. Both system gain and calibration target offset are determined periodically in flight for this conversion.

The offset calibration is obtained by viewing an ambient target 10e that is at a known physical temperature. The target used should have a high microwave emissivity, which assures that its brightness temperature can be equated with its physical temperature. A thermistor temperature sensor is mounted in the target, and the target is allowed to change temperature as the environment temperature changes. This arrangement reduces the difference between the temperature of the target and the air outside the aircraft, which in turn reduces the influence of any gain inaccuracies.

The gain calibration is obtained by injecting a known amount of extra microwave energy in the waveguide immediately behind the horn antenna. This calibration signal is generated by a broadband noise diode 10f, which has been calibrated before installation in the aircraft using external hot and ambient calibration targets (described below). The noise diode exhibits a stability that is adequate for establishing system gain.

The microprocessor 11a in the data unit 11 controls the stepper motor 10d for scanning the sensor unit. The microprocessor takes readings of the radiometer output and various MTP temperatures and records these data. The data unit is connected to the aircraft instrumentation 11b which includes an inertial navigation system (INS) to provide in situ EW and NS wind vector (U and V) information and other aircraft sensor inputs for stabilizing the radiometer viewing direction in the presence of aircraft roll and pitch and to monitor aircraft altitude and air temperature.

When the MTP is turned on from the cockpit, the data unit 11 automatically begins a series of 14-second observing cycles. A cycle consists of measuring the radiometer output from both channels for a sequence of viewing directions. There are 10 "sky" elevation angle views, and one view directed at the ambient calibration target. At the calibration target position, the calibration noise diode is also turned on to establish the radiometer gain for both channels. Note that the calibration noise of the diode 10f is coupled into the waveguide output of the horn antenna 10b. The temperatures of the radiometer window and diode are transmitted to the data unit 11 as analog temperatures.

Radiation received through the waveguide coupling of the horn antenna through an isolator 10g into the heterodyne radiometer 10a is mixed in a mixer 10g with the alternately selected local oscillator operated at 57.3 and 58.8 GHz. The oscillators are coupled to the mixer 10g by isolators 10h and 10i. At the output of the mixer 10g, an IF amplifier and detector 10j produce a voltage signal proportional to IF amplitude (i.e., atmospheric brightness temperature). A voltage-to-frequency converter 10k converts the voltage signal to a pulse train the frequency of which is proportional to signal voltage. The digital pulse train is transmitted to a microprocessor input unit 11c which receives that digital pulse train and other signals from the aircraft instrumentation including pitch, roll, U, V, T and P, the latter being pressure altitude. These are individually converted to digital form and stored until accessed by the microprocessor 11a. The analog temperatures are transmitted in analog form to the data unit 11 where an analog-to-digital converter 11d converts the analog temperatures in the various channels into digital form and stores them until accessed by the microprocessor 11a. A stepper motor controller 11e is driven by the microprocessor 11d to scan the radiometer in elevation angle through the requisite ten positions plus one position for the calibration target 10e.

The microprocessor 11a is programmed to carry out all of the data processing and analysis and to display on a CRT display 11f either selected data, such as altitude temperature profile, RRi or vertical wind shear (VWS), or text messages summarizing a warning of CAT likelihood, severity and recommended avoidance maneuver.

Figure 9A:
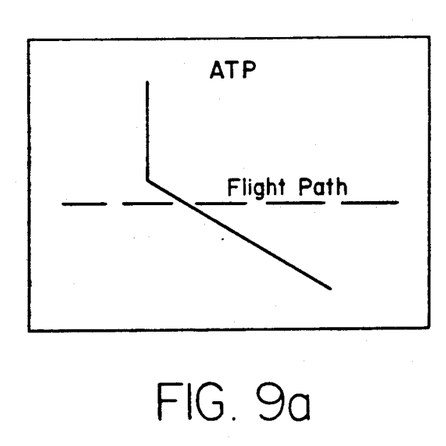
FIGS. 9a and 9b illustrate examples of a cockpit display that could be generated using the concepts of this invention.
Figure 9B:
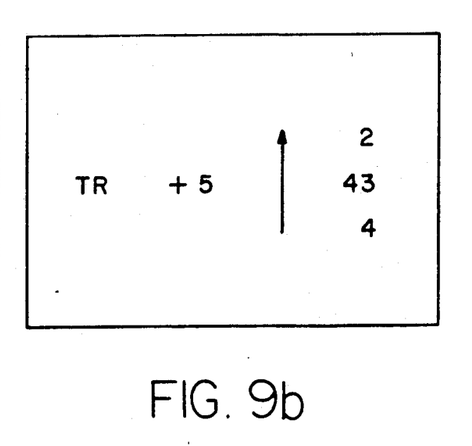

FIGS. 9a and 9b illustrate examples of a cockpit display that could be generated using the concepts of this invention. FIG. 9a is an ATP (altitude temperature profile) display which could be selected by the pilot. It is more likely that a message display will normally be presented. An example of a message display is shown in FIG. 9b. The message display includes the following information: "TR" means that a tropopause transition layer is nearby (in altitude); the "+0.5" states that the base altitude of this feature is 5 FL units above the aircraft, where one FL (flight level) unit is 100 feet; the up-arrow is a suggested avoidance maneuver; the vertical stack of numbers "2, 43, 4" signify that a minimal avoidance could be achieved by making a flight level change of 2 FL units upward, or 4 FL units downward, and that if no flight level change is made there is a 43% chance of moderate or greater CAT during the next 10 minutes.

APPENDIX
Derivation of Ri or RRi Equation $$Ri = \frac{g}{\theta} \frac{(d\theta/dz)}{(dW/dz)^2},$$

where $\frac{dW}{dz} = \left[\left(\frac{dU}{dz}\right)^2 + \left(\frac{dV}{dz}\right)^2\right]^{\frac{1}{2}}$ $$= \frac{9.8[m/s^2]}{\theta[K]} \frac{d\theta/dz[K \text{ per m}]}{(dW/dz)^2[m/s \text{ per m}]^2}$$

$$= \frac{9.8[m/s^2]}{\theta[K]} \frac{d\theta/dz[K \text{ per km}] \times 10^{-3}}{(dW/dz)^2[m/s \text{ per km}]^2 \times 10^{-6}}$$

-continued
APPENDIX $$= \frac{9800}{\theta[K]} \frac{d\theta/dz[K/km]}{(dW/dz[m/s \text{ km}])^2}$$

Note $dT/dz$ and $dW/d\theta$ are the measured properties.

$$\frac{d\theta}{dz} = \left(10 + \frac{dT}{dz}\right)\left(\frac{1000}{P[mb]}\right)^{0.286}$$

and $$\frac{dW}{dz} = \frac{dW}{d\theta} \frac{d\theta}{dz}$$

or $$\frac{dW}{dz} = \left[\left(\frac{dU}{d\theta}\right)^2 + \left(\frac{dV}{d\theta}\right)^2\right]^{\frac{1}{2}} \left(10 + \frac{dT}{dz}\right)\left(\frac{1000}{P[mb]}\right)^{0.286}$$

$$Ri = \frac{9800}{\theta[K]} \frac{1}{\left[\left(\frac{dU}{d\theta}\right)^2 + \left(\frac{dV}{d\theta}\right)^2\right]\left(10 + \frac{dT}{dz}\right)\left(\frac{1000}{P[mb]}\right)^{0.286}}$$

or $$RRi = \frac{\theta[K]}{9800}\left(10 + \frac{dT}{dz}[K/km]\right)\left(\frac{1000}{P[mb]}\right)^{0.286}\left[\left(\frac{dU}{d\theta}\right)^2 + \left(\frac{dV}{d\theta}\right)^2\right]$$

I claim:

1. A method for determining Richardson Number, Ri, or its reciprocal, RRi, for clear air turbulence prediction aboard an aircraft in flight comprising the steps of
   determining vertical gradient of potential temperature, $d\theta/dz$,
   determining the correlation of wind vector from said aircraft's instrumentation versus potential temperature, $dW/d\theta$,
   multiplying the gradient of potential temperature with altitude, $d\theta/dz$, by said gradient of wind vector with potential temperature, $dW/d\theta$, to obtain vertical wind shear, $dW/dz$, and
   calculating Richardson Number, Ri, from said vertical gradients from an equation $$Ri = k\left[\frac{d\theta}{dz} \div \left(\frac{dW}{dz}\right)^2\right]$$

or its reciprocal, RRi, for use in detecting a trend toward a threshold value for the purpose of predicting clear air turbulence.

2. A method as defined by claim 1 wherein said vertical gradient of potential temperature, $d\theta/dz$, is determined by measuring brightness temperature with a passive microwave radiometer operating at a frequency where oxygen molecules emit thermal radiation and scanning said radiometer through selected elevation angles above and below the flight line of said aircraft, and converting measured brightness temperature versus elevation angle to air temperature, T, versus altitude, z, and then converting said profiles of air temperature to profiles of potential temperature, $\theta$, and from said profiles deriving said vertical gradient of potential temperature $d\theta/dz$.

3. A method as defined in claim 2 wherein determining the correlation of wind vector from said aircraft's instrumentation versus potential temperature, $dW/d\theta$, is accomplished by determining the slope of both the east-west and north-south wind components, U and V, versus potential temperature $\theta$ to obtain $dU/d\theta$ and $dV/d\theta$ and computing the orthogonal sum $$[(dU/d\theta)^2 + (dV/d\theta)^2]^{\frac{1}{2}}$$

to obtain the gradient of wind vector with potential temperature, $dW/d\theta$.

4. A method for enhancing the quality of $dW/d\theta$ in claim 3 by reducing the influence of horizontal gradients of wind on the $dW/d\theta$ solution by performing a simultaneous regression of wind vector components U and V against both $\theta$ and time, so that the time correlation has minimum influence on the $\theta$ correlation.

5. A method as defined in claim 1 wherein Richardson Number, Ri, is the parameter of clear air turbulence prediction when the trend of Ri extends toward the critical region of 1 to $\frac{1}{4}$ from the normal range of 5 to 100 or the reciprocal Richardson Number, RRi, is determined as the parameter of clear air turbulence prediction when the trend of RRi extends toward the critical region of 1 to 4 from the normal range of 0.01 to 0.2.

6. A method as defined in claim 5 wherein the severity of the clear air turbulence predicted is determined by evaluation of $(dW/dz)^2$ calculated for the extrapolated situation of RRi=4, which is to say that the value of $(dW/dz)^2$ when RRi=4 can be calculated from the values of $d\theta/dz$ and $dW/dz$ during the time that RRi is trending toward the critical region 1 to 4.

7. A method for making predictions of near-future clear air turbulence aboard an aircraft in flight by combining many atmospheric observables and weighting each of said observables with an assigned coefficient previously determined by multiple regression analysis of a data base of the intensity of clear air turbulence recorded in the past together with attendant atmospheric observables, in which Richardson Number, Ri, or its reciprocal, RRi, is determined for clear air turbulences recorded in said data base from information in said data base for inclusion as an observable in said multiple regression analysis to determine a corresponding coefficient assigned thereto, and combining each observable measured in flight multiplied by said assigned coefficient determined by multiple regression analysis of said data base, including as an observable said Richardson Number, or its reciprocal, determined in accordance with claim 1 multiplied by said corresponding coefficient determined by multiple regression analysis of said data base.

* * * * *